Patented Apr. 8, 1924.                                                                 1,489,870

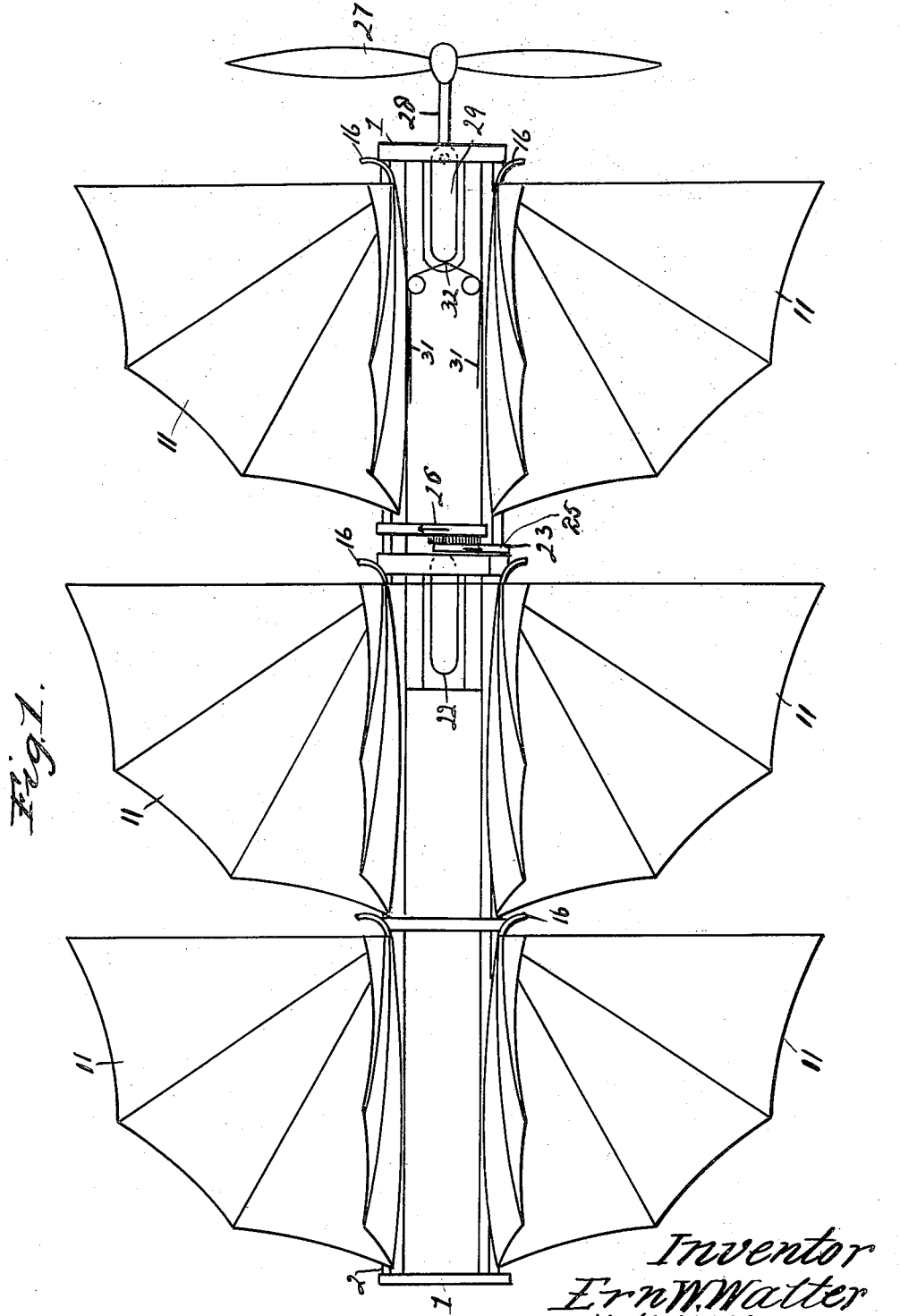

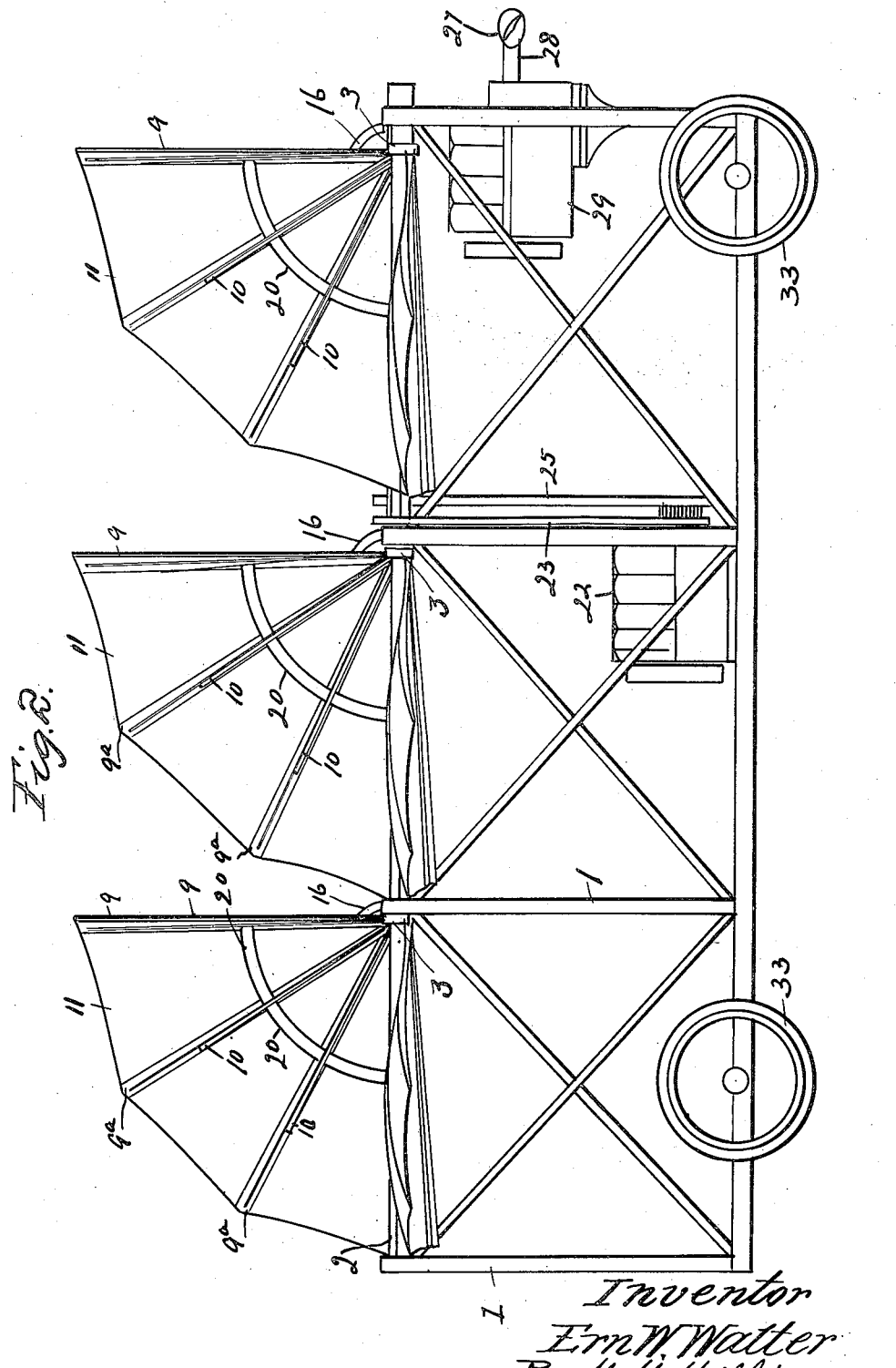

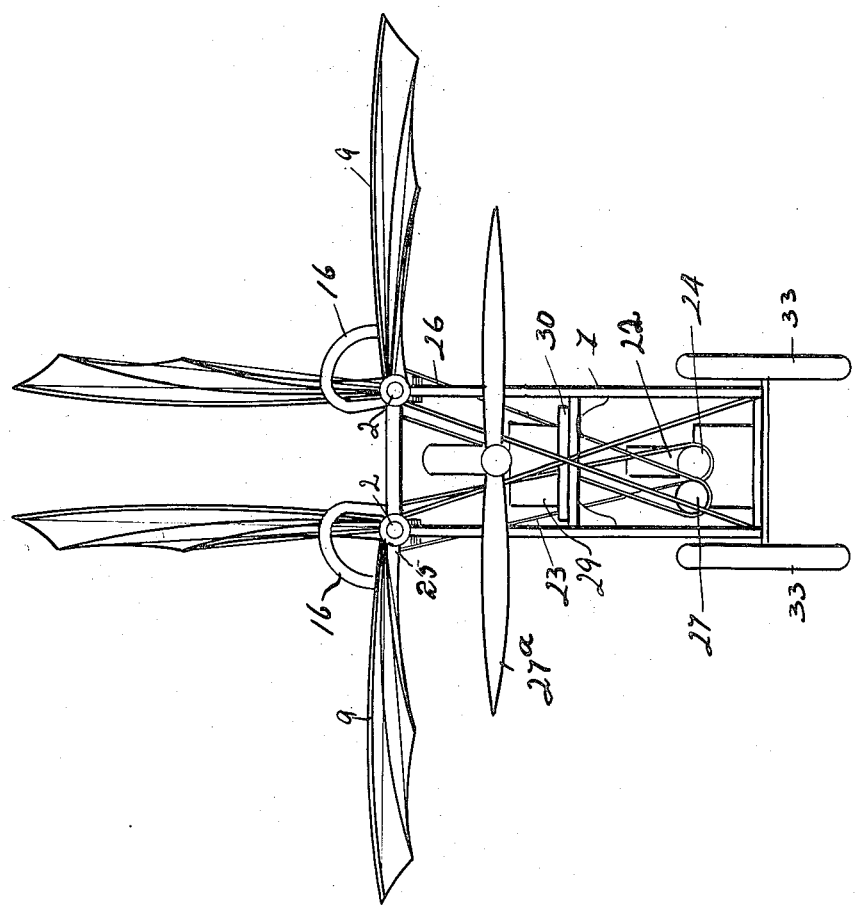

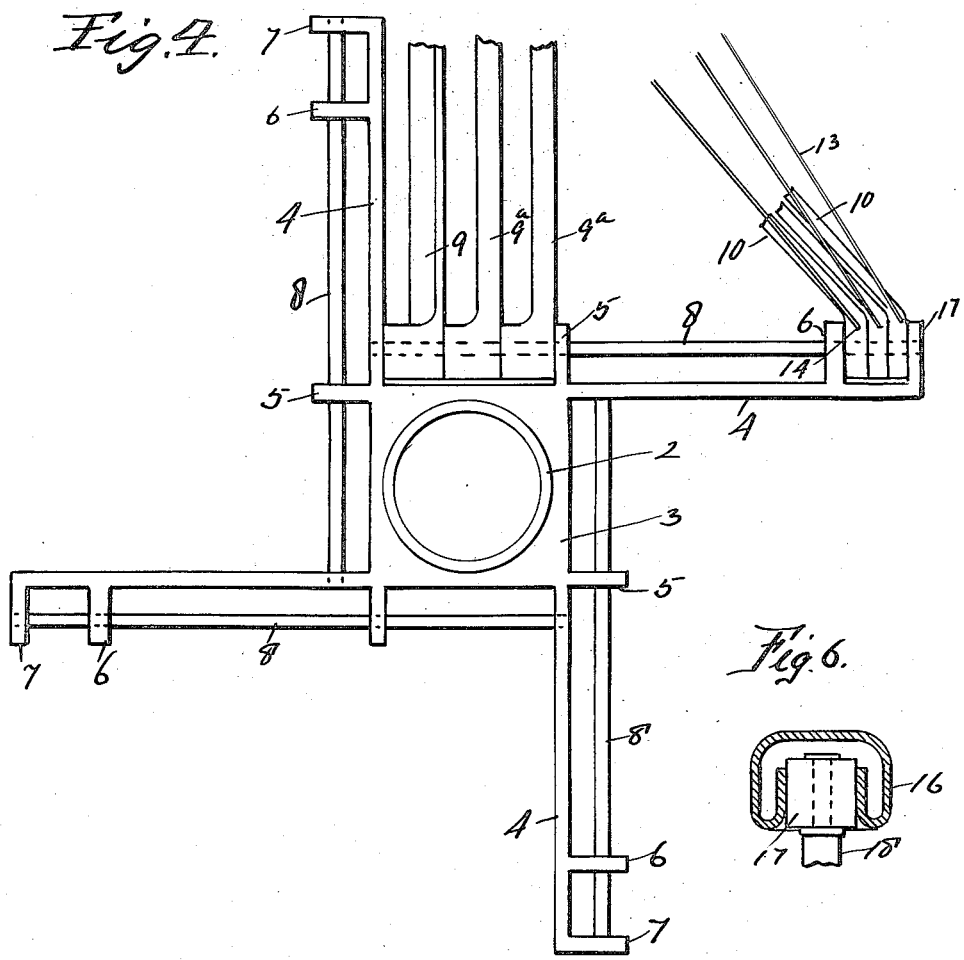
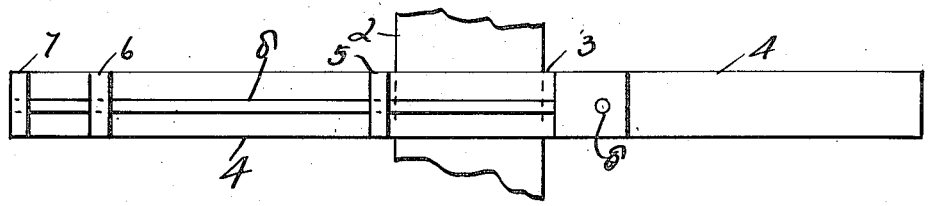

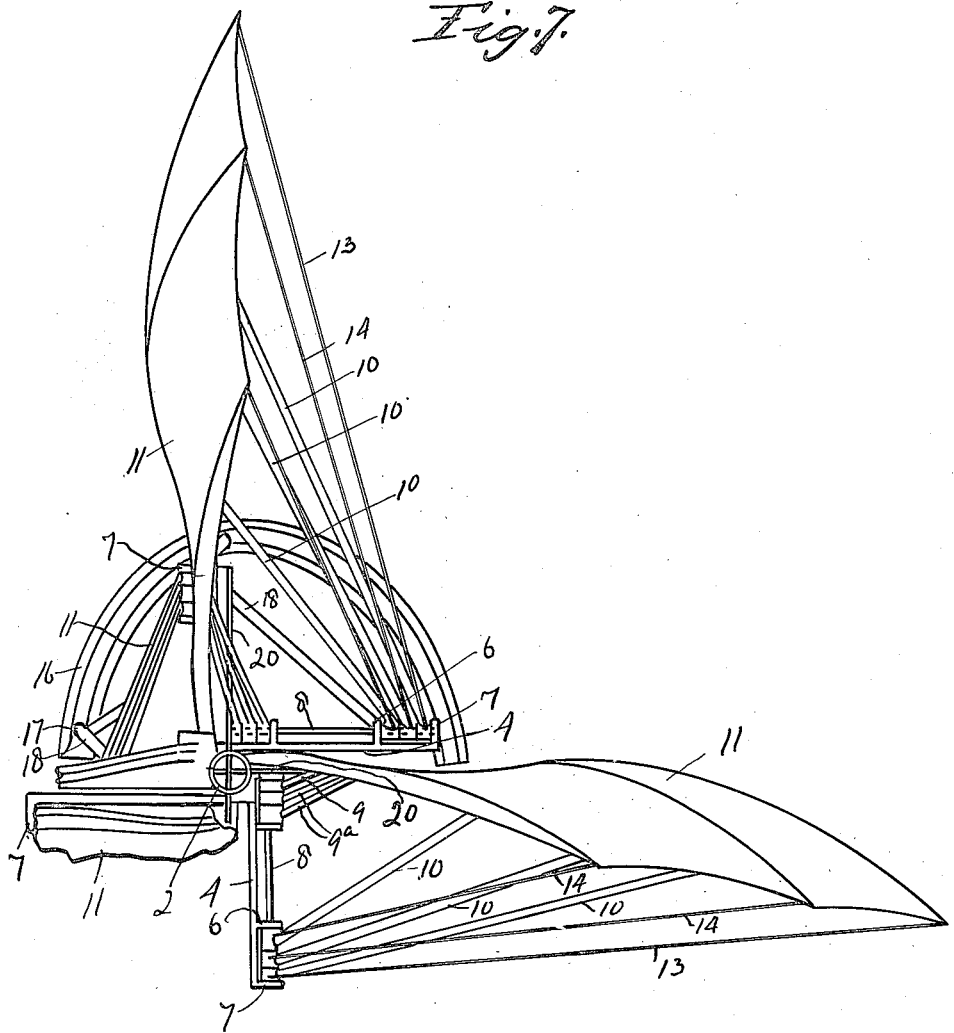

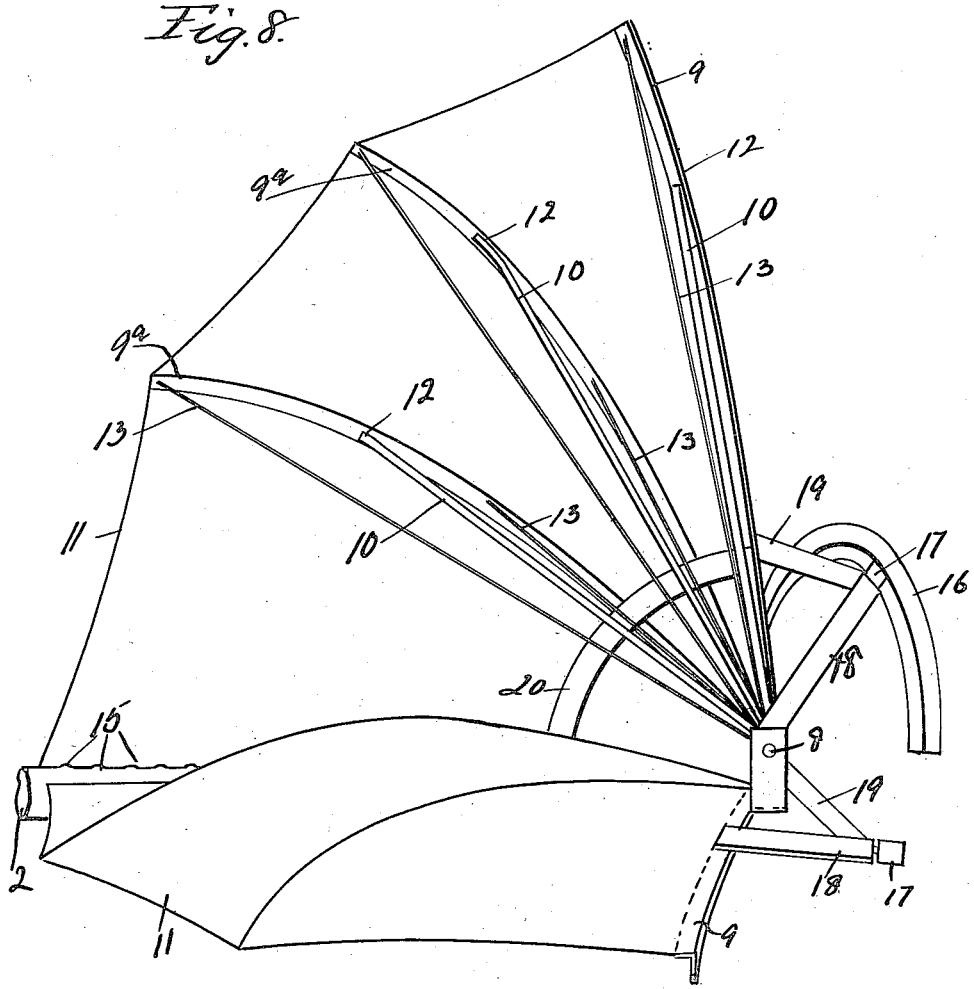

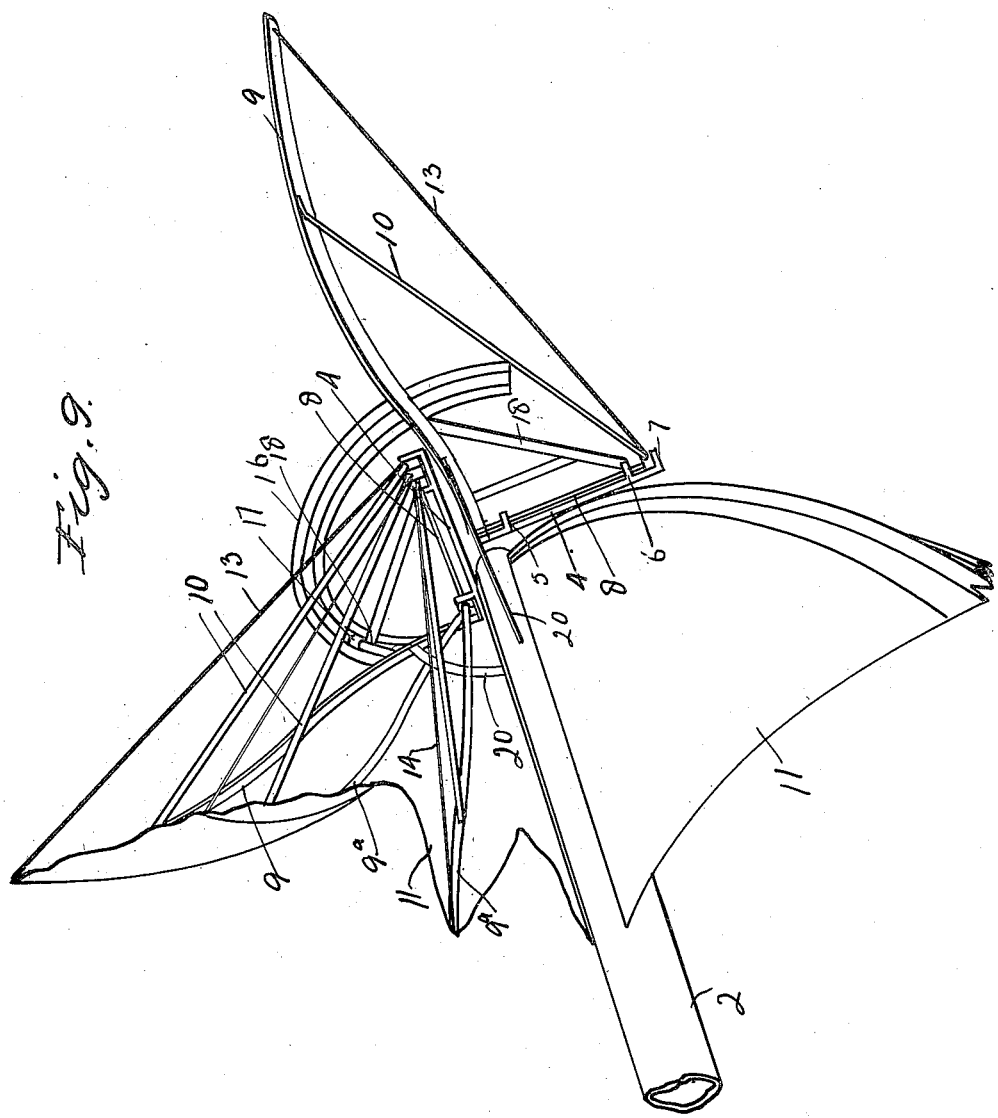

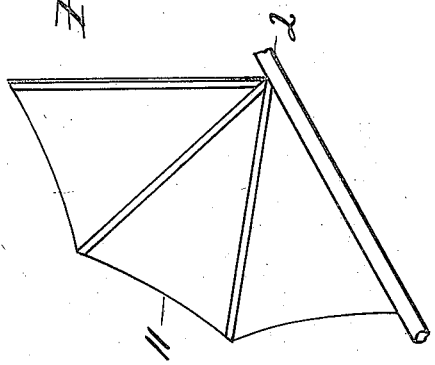
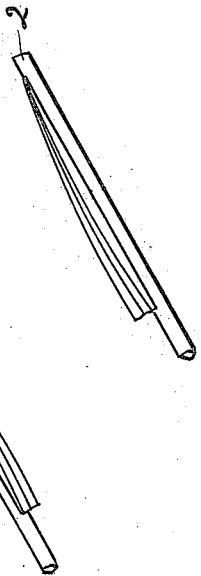
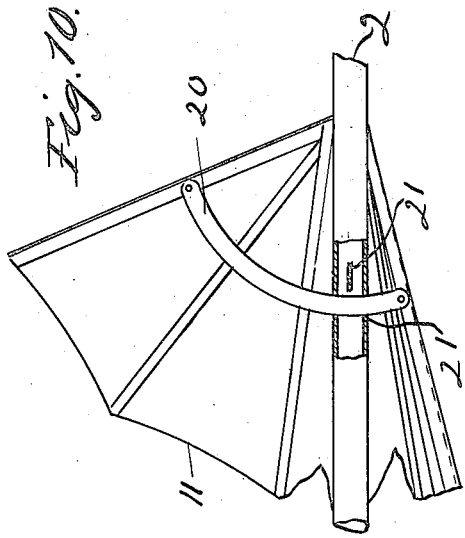
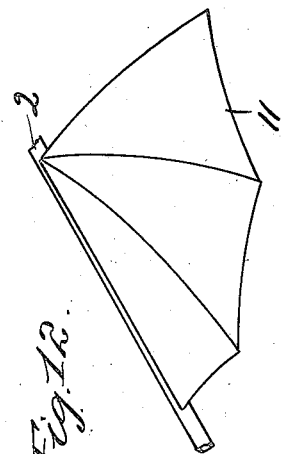

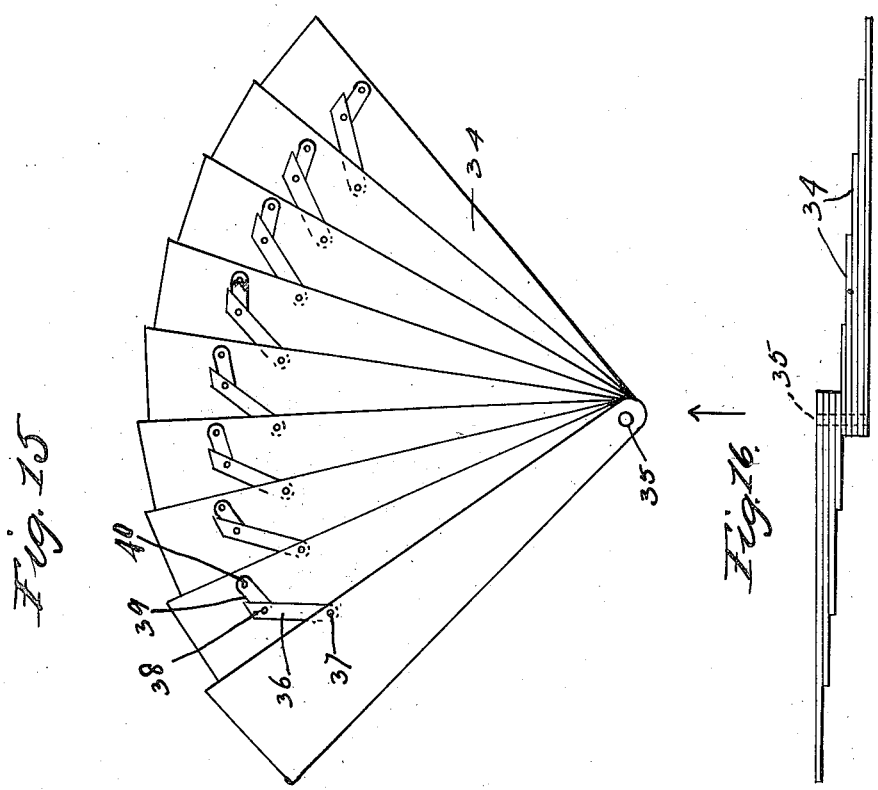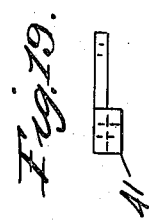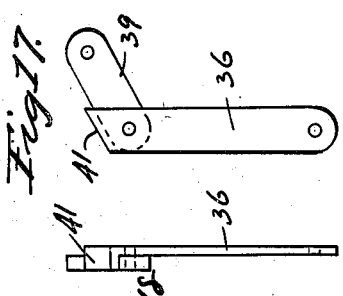

UNITED STATES PATENT OFFICE.

ERN W. WALTER, OF WOODLYNNE, NEW JERSEY.

FLYING MACHINE.

Application filed April 15, 1922. Serial No. 552,839.

*To all whom it may concern:*

Be it known that I, ERN W. WALTER, a citizen of the United States, residing at Woodlynne, in the county of Camden and State of New Jersey, have invented new and useful Improvements in a Flying Machine, of which the following is a specification.

My invention relates to a new and useful improvement in a flying machine, and has for its object to so construct a device of this description and the wings thereof that said wings when in operation will be alternately brought into action and carried out of action so as to give the general effect of the wings of a bird in beating downward upon the air.

A further object of my invention is to so construct a flying machine that each set of wings preferably consisting of four wings being secured to the main shaft in such manner that the revolving of said shaft in one direction will alternately bring said wings into and withdraw them from action.

A still further object of my invention is to so construct a flying machine that the sets of wings may be arranged in series upon two parallel shafts, said series consisting of as many sets of wings as may be necessary to accomplish the result desired.

A further object of my invention is to so mount a propeller carrying motor upon the frame of the machine that said motor may be swung through a limited horizontal arc for changing the direction of the pull of the propeller actuated thereby.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a plan view of my improved flying machine.

Fig. 2, is a side elevation thereof.

Fig. 3, is a front view of the machine.

Fig. 4, is an enlarged section of one of the main shafts showing one of the spider like hubs to which a set of wings is intended to be attached.

Fig. 5, is a plan view of Fig. 4.

Fig. 6, is a detail section of one of the cam-ways showing a portion of an actuated arm carrying an anti-friction roll running in said guideway.

Fig. 7, is an end view of one of the main shafts and spider hub carried thereby with two of a set of wings in active position.

Fig. 8, is a side elevation of one of the wings in a distended position just after the roll carried by its actuating arm has left the cam-way.

Fig. 9, is a perspective of a portion of one of the main shafts showing a set of wings in operation.

Fig. 10, is a side elevation of a portion of one of the main shafts showing a pair of one set of wings and the means for connecting the same together to cause one to fold while the other is being distended.

Fig. 11, is a detail perspective showing the position of one of the wings when first brought into active position.

Fig. 12, is a similar view showing the same wing moved to a position at right angles to that shown in Fig. 11 which may be designated as the second position.

Fig. 13, is a similar view showing the same wing just at the completion of the folding thereof which may be designated as the third position.

Fig. 14, is a similar view showing the same wing in the position just prior to the beginning of the distension thereof which may be designated as the fourth position.

Fig. 15, is a detail view of a slightly modified form of wing shown in its distended position.

Fig. 16, is an edge view of Fig. 15 looking in the direction of the arrow.

Fig. 17, is an enlarged detail view of one of the toggle joints for coupling the leaves of the modified form of wing together.

Fig. 18, is an edge view of Fig. 17.

Fig. 19, is a plan view of Fig. 17.

In carrying out my invention as here embodied, 1 represents the framework of the machine which may be of any design or construction suitable for supporting the various working parts and to provide space for the pilot and passengers and freight when desired and in this frame are mounted the main shafts 2 arranged parallel and intended to revolve in opposite directions to each other. Upon each of these shafts are secured a number of spider hubs 3, each hub being so constructed that a set of wings may be mounted thereon as hereinafter set forth. Each of the hubs 3 have formed therewith four arms 4 which extend at right angles to each other, each arm carrying the bearings 5, 6 and 7 and through these bearings pass the pintle rods 8 said pintle rods serving to pivot or hinge the wing ribs 9 and 9ª and the wing struts 10, the ribs 9 being preferably of metal L shaped in cross section while the ribs 9ª are preferably of wood or other like material and relatively wide and thin.

11 represents the covering of each wing which may be of canvas, silk or other suitable material and which is secured in any suitable manner to the outer ends of the ribs 9 and 9ª and around the edge of the rib 9 so that when this last named rib is swung in the proper direction the covering will be distended to bring the wing into active position and when swung in the reverse direction will close or fold the wing after the manner of a fan. The struts 10 extend at an angle from their hubs each strut being secured to one of the ribs as indicated at 12 so as to brace said ribs thereby providing a rigid structure for each wing capable of withstanding the strain to which said wing is subjected when in action. For further strengthening the wings stay wires 13 may be utilized, said wires being attached at suitable points to the rib and to the inner portions of the struts 10 as indicated at 14.

In order that the covering 11 may be drawn taut when the ribs are distended the inner edge of said covering is secured as indicated at 15 to the shaft 2 by lacing or otherwise.

From the foregoing it will be seen that each wing may be folded parallel with and against its shaft which is its inactive position or distended to its active position and when the machine is in action this is accomplished as follows:

For each set of wings there is provided a cam-way 16 said cam-way being rigidly mounted upon the frame of the machine having each end thereof open for the reception and guidance of the anti-friction roll 17 journalled upon the outer end of the actuating arm 18, one of said rods being secured to each of the ribs 9 and having a brace 19 also secured to said rib so that as each hub revolves with its shaft the cam rolls will successively pass into the inner end of the cam-way and traveling therethrough will distend the wing to which it is attached by swinging the rib 9 of said wing outward from the shaft to approximately right angles thereto this movement being caused by the shape of the cam-way as will be readily understood and in order that the wings may be successively folded by the same mechanism by which they are distended I couple each set of wings together in pairs, that is to say, the wings opposite each other in each set have the ribs 9 thereof connected to each other by a curved bar 20, said bars here shown as passing through suitable slots 21 formed in the shaft 2. By this arrangement as one wing is being distended as before described the wing opposite thereto will be folded as clearly illustrated in Fig. 10. Thus it will be seen that when the shafts 2 are revolved the wings will successively be distended as they are brought to the upper side of the shaft, as shown in Fig. 11, and held in its distended position during their downward movements so as to be thrust against the air for giving a lifting effect to the machine and when having passed through the effective downward movement will be folded inward against the shaft so as to prevent back beating thereby giving the general effect of the wings of a bird in action.

While I have here shown three sets of wings carried by each of the shafts 2 it is obvious that a greater or lesser number may be utilized but by experiment I have found that for ordinary purposes it is preferable to extend the shafts and use a relatively large number of wings so as to avoid great width to each spread thereby making said wings more rigid and better stabilizing the machine.

While the shafts may be revolved in any suitable manner I have here shown a motor 22 mounted upon the lower portion of the frame of the machine having a link belt 23 running from a spur gear 24 carried directly upon the shaft of the motor, said belt running over a suitable spur gear 25 upon one of the shafts 2 while the other shaft 2 is coupled by the link belt 26 with a spur gear 27 which is geared to the shaft of the motor so as to revolve in the reverse direction.

It is obvious that a machine as so far described when put in action will have only a lifting effect but by the proper setting and curving of the wings the action of said wings may also include forward propulsion, as for instance, if the wings slope backward from their ribs 9 so that the front edges of said wings when distended will be in a lower plane than the rear portion thereof the downward thrust of the wings will tend to beat the air rearward as well as downward and to that extent will force the machine forward after the manner of a propeller, but I prefer to provide for this forward movement of the machine through independent means which means are here shown as consisting of a propeller 27ª in order that the direction of the machine may be controlled without the use of a swinging rudder this propeller is secured upon a shaft 28 of a motor 29 which latter is mounted upon a turn table 30 so as to be swung from side to side within certain limits.

For convenience in swinging the motor 29 and consequently the propeller 27ª carried thereby I attach a cable 31 to said motor as at 32 carrying said cable rearward to any convenient point for manipulation by the pilot.

Any suitable wheels 33 may be utilized for running the machine over the ground in alighting but any suitable floats may be attached to the framework for alighting upon the water.

In the use of a machine made in accordance with my improvement a great advantage is gained in that no long runway is needed to take the air since the downward beating of the wings will permit the machine to rise directly from off the ground and likewise in alighting the rotation of the propeller may be stopped thus causing the machine to lose its forward motion after which by properly slowing down the revolving of the wings the machine may be descended in substantially a vertical line.

Another advantage gained by a machine made in accordance with my invention is that while it may ascend and descend with substantially no forward movement it may also glide or volplane by holding the wings in proper position and this action is facilitated by having certain of the wings standing at substantially a horizontal position which will bring certain other wings substantially vertical the latter acting as fins to prevent side slipping, thereby stabilizing the movements of the machine.

In Figs. 15 to 19 inclusive I have shown a slightly modified form of construction of wing which consists in utilizing metal or other rigid leaves 34, said leaves being pivoted together at their lower ends as indicated at 35, said leaves having a link 36 pivoted thereto at 37 which in turn is pivoted at 38 to a short link 39 pivoted to the next succeeding link as at 40 so that when the wing is distended the leaves will be prevented from passing beyond each other but caused to assume the positions shown in Fig. 15. Each of the links 36 has formed therewith a lug 41 which will abut against the upper edge of the link 39 thus limiting the movement of these links.

Of course I do not wish to be limited to the exact details of construction as herein shown as these may be varied within the limits of the appended claims without departing from the spirit of my invention.

Having thus fully described my invention, what I claim as new and useful is:—

1. In a flying machine, a rotatable shaft, a set of wings mounted upon said shaft in pairs, a rod connecting each pair of wings so that the distending of one wing will fold the other wing of the pair and vice versa, and means for revolving said shaft.

2. In a flying machine, the combination of a frame, two shafts mounted parallel upon said frame, a series of hubs secured to said shafts, series of ribs pivoted to each hub, series of struts also pivoted to each hub the outer end of each strut being secured to a corresponding rib, stay wires connecting the struts with the ribs, a flexible cover secured to each series of ribs for forming a wing surface, one edge of said cover also being secured to a shaft carrying a wing, an actuating arm secured to one rib of each series, a cam roll journalled upon the outer end of each arm, stationary cam-ways in which said cam rolls are adapted to travel, said cam-way being of such shape as to cause the wings to be distended at predetermined times, a curved bar coupling certain of the wings in pairs so that the distending of one wing of a pair will fold the other wing of the same pair, a motor for revolving the shafts to put the wings in action, a secondary motor, a turn table upon which said secondary motor is mounted, means for swinging said secondary motor upon the turn table, and a propeller carried by the shaft of the secondary motor for giving the machine forward motion.

3. In combination with a flying machine of the character described, two shafts mounted parallel upon the frame of the machine, each shaft having a series of hubs secured thereon, each hub comprising four arms, each arm having formed therewith bearings, pintles passed through said bearings, a set of ribs pivoted upon each of said pintles, a set of struts also pivoted upon each of said pintles, said struts extending at angles each being secured to one of the ribs, stay wires secured to the ribs and the struts, a flexible cover for each set of ribs, one edge of each cover being secured to its shaft, and a curved bar coupling the main ribs in each opposite set.

4. In combination with a flying machine of the character described, two shafts mounted parallel upon the frame of the machine, each shaft having a series of hubs secured thereon, each hub comprising four arms, each arm having formed therewith bearings, pintles passed through said bearings, a set of ribs pivoted upon each of said pintles, a set of struts also pivoted upon each of said pintles, said struts extending at angles each being secured to one of the ribs, stay wires secured to the ribs and the struts, a flexible cover for each set of ribs, one edge of each cover being secured to its shaft, a curved bar coupling the main ribs in each opposite set, an actuating arm secured to one of the ribs of each set, a cam roll journalled upon the outer end of each arm, stationary cam-ways for each hub in which said cam rolls are adapted to travel through a portion of the rotation of the shaft, said cam-ways being of such curvature as to distend the particular wing when the cam roll of the latter is traveling in said cam-way.

5. A wing for a flying machine comprising a series of leaves pivoted together, long links pivoted to the leaves, short links pivoted to adjacent leaves, said links being pivoted together, and a lug carried by one of the links for limiting the swinging movement of said links.

6. A wing member for a flying machine comprising a hub adapted to be rigidly mounted upon a revolving shaft, arms formed with said hub, ribs pivoted to said arms, trusses also pivoted to said arms and said ribs, a suitable covering secured to the ribs of each wing, an arm carried by one of the ribs of each wing, a cam roll journalled upon the outer end of said arms, said roll adapted to travel in a cam-way for distending and folding the wings.

In testimony whereof, I have hereunto affixed my signature.

ERN W. WALTER.